United States Patent [19]

Garner

[11] 4,130,688

[45] Dec. 19, 1978

[54] ELECTROCONDUCTIVE RESINS AND INTERMEDIATES AND ELECTROCONDUCTIVE COATED PAPER

[75] Inventor: Joseph L. Garner, Sanford, Mich.

[73] Assignee: The Dow Chemical Company, Midland, Mich.

[21] Appl. No.: 868,095

[22] Filed: Jan. 3, 1978

Related U.S. Application Data

[62] Division of Ser. No. 668,335, Mar. 19, 1976, Pat. No. 4,071,666.

[51] Int. Cl.$^2$ .................................................. C08K 5/03
[52] U.S. Cl. .............................. 428/342; 260/33.2 R; 260/33.6 UA; 260/33.8 UA; 427/391; 428/514; 526/1
[58] Field of Search ............... 428/514, 342; 526/1; 427/391; 260/33.2 R, 33.6 UA, 33.8 UA

[56] References Cited

U.S. PATENT DOCUMENTS 4,071,666  1/1978  Garner ................................. 526/1

Primary Examiner—Marion E. McCamish
Attorney, Agent, or Firm—David H. Fifield

[57] ABSTRACT

This invention relates a relatively low molecular weight polystyrene having a narrow molecular weight distribution range in combination with a 1 to 3-aromatic hydrocarbon ring compound, chloromethylated derivatives thereof, quaternary amine derivatives of said chloromethylated derivatives and the use of such amines as electroconductive resins for the preparation of electroconductive coated papers useful for electrographic printing.

9 Claims, No Drawings

ELECTROCONDUCTIVE RESINS AND INTERMEDIATES AND ELECTROCONDUCTIVE COATED PAPER

CROSS-REFERENCE TO RELATED APPLICATIONS

This is a division of application Ser. No. 668,335 filed Mar. 19, 1976, U.S. Pat. No. 4,071,666. Copending applications Ser. Nos. 811,511 and 818,686 filed June 30, 1977, and July 25, 1977, respectively, by myself and others describe a method for making the polystyrene starting materials which may be employed in making my invention. Said disclosures are hereby incorporated by reference. Copending application Ser. No. 715,733 filed Aug. 19, 1976, now U.S. Pat. No. 4,087,599, by Roe et al. describes electroconductive resins and flocculants containing Component A alone of the composition of the instant invention.

BACKGROUND OF THE INVENTION

The use of polymers of vinylbenzyl quaternary ammonium compounds as electroconductive coatings for paper has been known for some years. U.S. Pat. No. 3,011,918 illustrates such polymers which have been used for electroconductive coatings for paper. These materials are generally derived from radical polymerization and have a broad molecular weight distribution.

SUMMARY OF THE INVENTION

I have discovered that in the preparation of electroconductive coated paper a composition, obtained by chloromethylating or bromomethylating and thereafter quaternizing with a tertiary amine a blend comprising Component A and Component B, may be substituted for commercially available electroconductive resins. In such a composition, Component A is a relatively low molecular weight polystyrene having a weight average molecular weight (hereafter $\overline{M}_w$) of between about 5,000 to about 45,000, and a molecular weight distribution (hereafter $\overline{M}_w/\overline{M}_n$) range of about 2 to about 6 and Component B is a cyclic hydrocarbon compound of from 9 to about 25 carbon atoms, which may also contain up to two hetero-oxygen atoms, comprising 1 to 3 benzoaromatic rings. This provides a coated paper having surface electrical properties equivalent to those prepared from commercial resins.

It is surprising that while Component A alone, chloromethylated and then quaternized, will not give an electroconductive starch base resin formulation having electroconductive properties equivalent to that of a commercial resin, the addition of about 5% to 15%, based on the weight of Component A, of Component B will yield a product which when chloromethylated and thereafter quaternized produces an electroconductive starch base resin formulation which imparts to a treated sheet of paper surface resistance characteristics equivalent to commercial products. My invention consists of the composition comprising Components A and B, a derivative thereof which has been chloromethylated or bromomethylated to introduce chloromethyl or bromomethyl groups on about 70% to 90% of the aromatic rings thereof, a composition obtained by reacting said chloromethylated or bromomethylated composition with a tertiary amine in an amount sufficient to convert at least about 90% of the chloromethyl or bromomethyl groups to quaternary ammonium groups, a process for producing an electroconductive copying paper comprising coating a copying paper base with about 0.1 to about 3 lb of the composition containing the quaternary ammonium groups per 3,000 square feet per side of copying paper base, and an electroconductive coated copying paper produced according to said process.

Preferred in the invention are Component A and Component B blends comprising about 88 to about 92 parts Component A and about 8 to about 12 parts of Component B and the chloro- or bromomethylated and quaternized derivatives thereof and the process of using said derivatives to prepare an electroconductive coated copying paper. A preferred mode of the invention is that wherein Component B is biphenyl or naphthalene, most preferably biphenyl. In another preferred mode, Component A is characterized by a $\overline{M}_w$ of about 10,000 to about 30,000. With regard to the quaternary ammonium derivatives of the composition comprising Component A and Component B, a preferred mode is that derivative prepared utilizing a tertiary amine described under the heading Quaternization, below, wherein $R_1$, $R_2$ and $R_3$ are methyl groups which are produced by employing trimethylamine in the quaternization reaction.

DETAILED DESCRIPTION OF THE INVENTION

Component A

Component A is a relatively low molecular weight polystyrene of $\overline{M}_w$ of about 5,000 to about 45,000 and preferably of about 10,000 to about 30,000. It is characterized by a relatively narrow molecular weight distribution curve with a $\overline{M}_w/\overline{M}_n$ range about 2 to about 6, preferably about 3 to about 5. Component A may be obtained by ultracentrifugation of a radically polymerized polystyrene sample or by the separation of the proper molecular weight fraction of such a sample by gel permeation chromatography techniques. It is preferred, however, to prepare the Component A polymer by cationic polymerization of styrene.

The cationic polymerization of styrene to obtain Component A of the desired molecular weight and molecular weight distribution is accomplished by contacting about a 20 to 50 weight percent solution of styrene monomer in a suitable inert solvent with a cation generator, such as strong Lewis acid, under substantially isothermal conditions. Polymerization is carried out by thoroughly mixing the monomer solution with the cation generator and removing sufficient heat from the reaction vessel to maintain the polymerization mass at the desired temperature range. Preferably this is accomplished by passing the monomer solution through a continuous flow reactor vessel and injecting the cation generator, with good mixing, at various points along the flow path of the monomer solution in the reactor.

The polymerization reaction is suitably accomplished by preheating about a 30% solution of styrene monomer in ethylene dichloride to from about 20° to about 80° C. prior to passing this solution down a tubular reactor made of suitable material resistant to $BF_3$, e.g., Hastelloy alloy, and injecting, with good mixing, a solution of $BF_3$ in ethylene dichloride at at least 2 or more points along the length of the reactor. The styrene monomer solution should contain a trace of water, e.g. about 10 to about 100 ppm based on styrene, to activate the $BF_3$ cation generator.

The amount of $BF_3$ injected is such that by the time a given cross-section of the reaction mass has moved through the reactor vessel, a total of about 1,000 to about 2,000 ppm of $BF_3$, based on styrene, will have been added to the reaction mass. For a given temperature of reaction, decreasing the concentration of the $BF_3$ will proportionately increase $\overline{M}_w$ of the final product and vice-versa.

The $BF_3$ gas is dissolved in ethylene dichloride by mixing the two components in a closed container under a pressure of about 100 psig. This pressure may be supplied by the internal pressure in a cylinder of commercially purchased $BF_3$ gas. This pressure is also useful to force the $BF_3$ solution through conduits to the injection points in the reactor or the solution may be pumped by conventional means. The solution is metered into the reactor in quantities sufficient to attain the desired $BF_3$/styrene ratio, depending on the reactor flow rate. At the point of injection of the $BF_3$ solution it is desirable to have good mixing to insure complete contact between the $BF_3$ and the styrene monomer. This may be accomplished by the insertion of baffles in the line just after the point of injection to create turbulent mixing.

The heat of reaction generated by the contact of $BF_3$ with the wet styrene monomer is removed from the reaction mass by conventional heat exchange means. This is conveniently done by utilizing a shell and tube heat exchanger as the portions of the reaction vessel immediately following the points of injection of the $BF_3$ solution. Depending upon the amount of heat removed immediately after injection, $\overline{M}_w$ is determined. Maintenance of a lower temperature will result in higher $\overline{M}_w$ of the final product while the move heat that is allowed to remain in the reaction medium, the lower proportionately will be $\overline{M}_w$. The portion of the reactor immediately following the last $BF_3$ injection point is most conveniently not cooled, allowing the reaction mass to heat up, thereby removing any residual unsaturation that may remain at that point in the reaction mass. The range of $\overline{M}_w/\overline{M}_n$ is controlled by maintaining the reaction mass at a relatively constant temperature while the reaction proceeds. A temperature ranging between about 20° C. and about 100° C. is suitable for the purposes of the invention to give a distribution of $\overline{M}_w/\overline{M}_n$ of about 3 to 6.

In the preparation of a polystyrene of about 13,000 $\overline{M}_w$ and $\overline{M}_w/\overline{M}_n$ of about 4.9, the monomer solution is preheated to about 60° C. prior to the point of the first $BF_3$ injection, is then cooled to about 75° C. prior to the second point of injection and cooled to about 50° C. prior to the third point of injection. The temperature is thereafter allowed to rise due to exothermic heat of reaction and after the fourth point of injection. The concentration of monomer is 30% by weight in the ethylene dichloride solution and the concentration of $BF_3$, based on styrene monomer, is about 560 ppm injected in four equal portions over the course of the reaction.

After completion of the reaction, the reaction mass is contacted with sufficient ammonia to neutralize all residual $BF_3$ in the polymerization mass and the ammonia:$BF_3$ complex is removed by a brief water wash. The mass then is heated to about 85° to distill off the ethylene dichloride solvent and leave the desired polystyrene product for subsequent use.

Component B

Component B is a cyclic hydrocarbon of from 9 to about 25 carbon atoms and which may contain up to 2 hetero-oxygen atoms, comprising 1 to 3 benzoaromatic rings, and is a low molecular weight compound of less than about 400, preferably less than about 250 molecular weight. Component B is exemplified by the compounds naphthalene and anthracene and their partially saturated analogs and homologs such as indane, indene, fluorene, 1,2,3,4-tetrahydronaphthalene, biphenylene and the like, and biphenyl, bibenzyl, benzyl benzene, diphenyl propane, phenyl ether, benzyl ether, diphenyl benzene and the like and the above compounds bearing up to about 3 lower alkyl groups on the aromatic portions thereof, e.g. methylnaphthalene. Also useful are cyclic dimers and trimers of α-methylstyrene which are believed to be structurally similar to those compounds mentioned above. Mixtures of the above-compounds may also suitably be employed as Component B.

Preferred in the invention as Component B are compounds represented by the formulas

wherein —X— is —O— or $C_1$-$C_3$ alkylene, a is zero or one and b is 1 or 2, with the proviso that the compounds may bear up to 3 methyl or ethyl groups. Most preferred as Component B in the invention are biphenyl and naphthalene. The higher molecular weight, fused aromatic systems such as anthracene require extended times for chloromethylation and for that reason are not as desirable as other compounds mentioned above for use as Component B.

Component B and Component A are suitably mixed by mechanically blending the two components together. The blend is then ready for chloromethylation or bromomethylation.

Chloromethylation

The Component A-B blend is chloromethylated, or alternatively bromomethylated, by contacting the blend with chloromethylmethyl ether or bromomethylmethyl ether in the presence of zinc oxide. About 2 moles of the ether is employed for each mole of aromatic ring present in the Component A-B blend and about 0.1 to 0.2 mole of the zinc oxide per mole of the ether. The zinc oxide is first added to the ether in an ice bath and allowed to exotherm and after the temperature returns to about 20° C., the Component A-B blend is added thereto with mixing and the temperature brought to about 50–55° C. and maintained at this temperature for about 2 hours. At this time, about 75% of the aromatic rings are chloromethylated or bromomethylated. The reaction mixture is washed with two portions of water, each equal to about half of its volume.

Quaternization

Tertiary amines to be employed in the quaternization of the chloromethylated or bromomethylated Component A-B blend previously described are represented by the formula

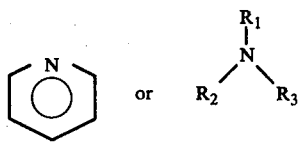

wherein $-R_1$, $-R_2$ and $-R_3$ are independently $-CH_2CH_2OH$, $-CH_2CHOHCH_3$, $-CH_2CHOHCH_2OH$, alkyl, aryl, cycloalkyl or aralkyl. Preferably, $R_1$, $R_2$ and $R_3$ are methyl groups, i.e., trimethylamine is employed. The tertiary amine is employed in an amount sufficient to convert at least about 90 percent of the chloromethyl or bromomethyl groups to quaternary ammonium groups.

The chloromethylated, washed blend is added to about an equal volume of water and about an equal volume of 25% trimethylamine (i.e., greater than the stoichiometric amount for complete quaternization) or other tertiary amine of the formula previously described. The mixture is stirred at about 45° C. to 50° C. for one hour. The inert solvent and water layers are then allowed to coalesce and separate at which time the water layer containing the quaternized product is recovered and distilled to further concentrate if desired.

Electroconductive Paper

In preparing paper having a printing surface containing electroconductive quaternized blend, the blend can be incorporated on paper neat or in standard formulations by coating, dipping, brushing, calendering or other usual ways of applying a solution or dispersion to paper and thereafter drying the same to produce a final product containing the electroconductive quaternized coating in the desired amount. The proportion of the electroconductive coating can be varied in the amount corresponding to from about 0.1 to about 3 lb (solids) of the quaternized blend per 3,000 square feet per side of the paper coated. The amount of the quaternized blend to be incorporated on the paper can be varied by changing the concentration of the quaternized blend in the aqueous solution of dispersion employed for the coating or dipping operation. Drying in a forced-air circulating oven maintained at a temperature of about 105° C. for about 1–2 minutes is a suitable method for drying the coating applied to the paper.

SPECIFIC EMBODIMENTS OF THE INVENTION

In the following examples, a standard electroconductive resin sold by The Dow Chemical Company as DOW ECR 34 Resin which is based on a polymeric vinylbenzyl trimethyl ammonium chloride, is tested as a reference material. This material, and other electroconductive coatings to be compared thereto, are tested for surface electrical resistance (hereafter SER) according to a method similar to that of ASTM D257-75 on an electrometer, Model No. 610-B supplied by Keithley Instruments, Inc., Cleveland, Ohio. The copying paper base employed in the examples is a 38 lb precoated base stock suitable for subsequent electroconductive coating on both sides supplied by Weyerhaeuser Company.

The standard electroconductive resin and the samples to be compared thereto are blended with standard ingredients: PG 280 starch, a low-viscosity, hydroxyethylated anionic starch supplied by Penwick & Ford Ltd. and HF Clay, a #1 clay pigment supplied by J. M. Huber Corp., in the weight ratio of 2:1:1 (solids) clay:-starch:electroconductive resin, respectively. This blended electroconductive resin formulation is applied to the copying paper base using a Time-Life blade coater which evenly spreads the formulation onto the surface of the paper base sheets.

The coated paper is dried in a forced-air circulating oven at a temperature of about 105° C. for about 2 minutes. After trimming off the edges of the paper, approximately 6 pieces of 3-inch square samples are cut from the sheet and are conditioned for about 16 hours at about 25° C. and 10% relative humidity. The SER, in ohms, is determined by averaging six readings (60 seconds current each) for each sample that is tested.

In each comparison with the standard, Component A of the composition is a polystyrene characterized by $\overline{M}_w$ of about 13,000 and $\overline{M}_w/\overline{M}_n$ of about 4.9 for Polystyrene #1 and $\overline{M}_w$ of about 21,000 and $\overline{M}_w/\overline{M}_n$ of about 5.3 for Polystyrene #2. To Component A is added (where appropriate) 10% by weight of Component B and the composition is chloromethylated and thereafter quaternized with trimethylamine in a manner similar to that described above. The standard or the sample is then formulated with clay pigment and starch and applied to the paper base as described above.

EXAMPLE 1

In this example, the DOW ECR 34 Resin formulation's SER is measured in the manner described above and the log of the SER is calculated. Runs are made on electroconductive formulations derived from the polystyrene component A plus 10% component B (chloromethylated and quaternized in the manner previously described) measuring the SER of each and their logarithms are calculated. The long SER of the standard minus the log SER of the samle is then computed and is reported in Table I, below. The accuracy of log SER is ±0.05. A positive Δ log SER means better electroconductivity than the standard sample and a negative number means poorer electroconductivity than the standard. The paper sheets are coated, on the wire side only, with 1.5 lb electroconductive resin formulation per side per 3,000 square feet of paper.

TABLE I

| | Sample* | Δ log SER, wire side |
| Run | Component A | Component B (10 wt % of A) | (log SER standard-log SER sample) |
| --- | --- | --- | --- |
| 1 | Polystyrene #1 | None | − 0.09 |
| 2 | Polystyrene #2 | biphenyl | + 0.10 |
| 3 | Polystyrene #2 | naphthalene | − 0.03 |
| 4 | Polystyrene #2 | ethyl benzene | − 0.20 |
| 5 | Polystyrene #2 | linear styrene dimer | − 0.15 |
| 6 | Polystyrene #2 | mixture of cyclic dimers & trimers of α-methyl styrene | + 0.09 |

*As a 50:25:25 - clay pigment:starch:electroconductive resin formulation.

EXAMPLE 2

In the following runs, paper sheets coated on both sides with about 1.5 lb per 3,000 square feet per side, of electroconductive resin formulation, are tested using the technique described in Example 1, except that both sides of the paper are coated with the electroconductive resin formulation. The standard is the DOW ECR 34 Resin and Component A is Polystyrene #1 or #2 which is chloromethylated and quaternized with trimethylamine in the manner previously described. Comparison of the standard to Polystyrene #1 alone and Polystyrene #2 with 10% biphenyl, is reported in Table II, below. The long SER values for both the wire side and the felt side of the paper are given as are the Δ log SER between the standards and the samples.

In formulations applied to the paper base as neat electroconductive resin dispersions or with polyvinyl alcohol substituted for starch, the SER values of a paper base treated with formulations derived from chloromethylated and quaternized Component A alone are comparable to values of a paper base treated with comparable formulations derived from the DOW ECR 34 Resin. Chloromethylated and trimethylamine quaternized compositions of the invention, wherein Component B is biphenyl, exhibit appreciably lower skin absorption toxicity in laboratory animals than does the DOW ECR 34 Resin standard.

TABLE II

| Run | Sample* Component A | Sample* Component B (10 wt % of A) | log SER Wire (Side/Felt Side) | Δ log SER |
|---|---|---|---|---|
| 1a | DOW ECR 34 resin | (standard) | 10.21/10.07 | −0.68/−0.67 |
| 1b | Polystyrene #1 | none | 10.89/10.74 | |
| 2a | DOW ECR 34 resin | (standard) | 10.23/ 9.96 | +0.01/−0.02 |
| 2b | Polystyrene #2 | biphenyl | 10.22/ 9.98 | |

*As a 2:1:1-clay pigments:starch:electroconductive resin formulation.

I claim:

1. A process for producing an electroconductive coated paper comprising coating a copying paper base with about 0.1 to about 3 pounds of an electroconductive composition per 3,000 square feet per side of the copying paper base said electroconductive composition having been prepared by chloromethylating or bromomethylating a first composition which comprises, by weight, Component (A) from about 85 to about 95 parts of a polystyrene characterized by a weight average molecular weight, $\overline{M}_w$, of about 5,000 to about 45,000 and an average molecular weight distribution, $\overline{M}_w/\overline{M}_n$, of about 2 to about 6; and Component (B) from about 15 to about 5 parts of a cyclic hydrocarbon of from 9 to about 25 carbon atoms which may contain up to two hetero-oxygen atoms, comprising 1 to 3 benzoaromatic rings;

thereby introducing chloromethyl or bromomethyl groups on about 70 to 90 percent of the aromatic rings of said first composition and obtaining as a result thereof a chloromethylated or bromomethylated second composition and thereafter reacting the second composition with a tertiary amine of the formula

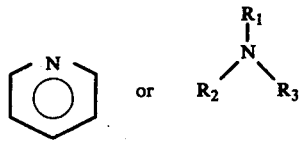

wherein $-R_1$, $-R_2$ and $-R_3$ are independently $-CH_2CH_2OH$, $-CH_2CHOHCH_3$, $-CH_2CHOHCH_2OH$, alkyl, aryl, cycloalkyl or aralkyl, in an amount sufficient to convert at least about 90 percent of the chloromethyl or bromomethyl groups of the second composition to quaternary ammonium groups.

2. The process of claim 1 wherein Component B, prior to chloromethylation or bromomethylation of the first composition, is biphenyl or naphthalene.

3. The process of claim 2 wherein Component A, prior to chloromethylation or bromomethylation of the first composition, is characterized by a $\overline{M}_w$ of about 10,000 to about 30,000.

4. The process of claim 3 wherein, prior to chloromethylation or bromomethylation, the first composition comprises about 88 to about 92 parts of Component A and about 8 to about 12 parts of Component B which is biphenyl.

5. The process of claim 1 wherein, prior to chloromethylation or bromomethylation of the first composition Component A is characterized by a $\overline{M}_w$ of about 13,000 to about 21,000, a $\overline{M}_w/\overline{M}_n$ of about 5, and Component B is biphenyl; and $R_1$, $R_2$ and $R_3$ of the tertiary amine are methyl groups.

6. The process of claim 1 wherein $\overline{M}_w/\overline{M}_n$ of Component A of the first composition prior to chloromethylation or bromomethylation is about 3 to about 5.

7. The process of claim 1 wherein $R_1$, $R_2$ and $R_3$ of the tertiary amine are methyl groups.

8. The process of claim 1 wherein the tertiary amine is trimethylamine.

9. An electroconductive coated paper produced according to the process of claim 1.

* * * * *

UNITED STATES PATENT AND TRADEMARK OFFICE
CERTIFICATE OF CORRECTION

PATENT NO. : 4,130,688

DATED : December 19, 1978

INVENTOR(S) : Joseph L. Garner

It is certified that error appears in the above-identified patent and that said Letters Patent are hereby corrected as shown below:

Column 3, line 31: "move" should read --more--.

Column 5, line 35: "of dispersion" should read --or dispersion--.

Column 6, line 27: "long" should read --log--.

Column 6, line 28: "samle" should read --sample--.

Column 6, line 66: "long" should read --log--.

Signed and Sealed this

Seventeenth Day of April 1979

[SEAL]

Attest:

RUTH C. MASON
Attesting Officer

DONALD W. BANNER
Commissioner of Patents and Trademarks